Oct. 12, 1943.　　　　　G. V. NOLDE　　　　　2,331,418
APPARATUS FOR MEASURING MAGNETIC CHARACTERISTICS OF MATERIALS
Filed Jan. 8, 1940　　　2 Sheets-Sheet 1
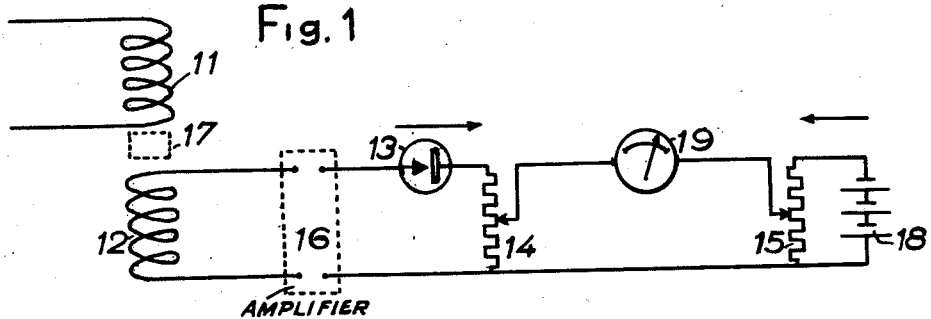
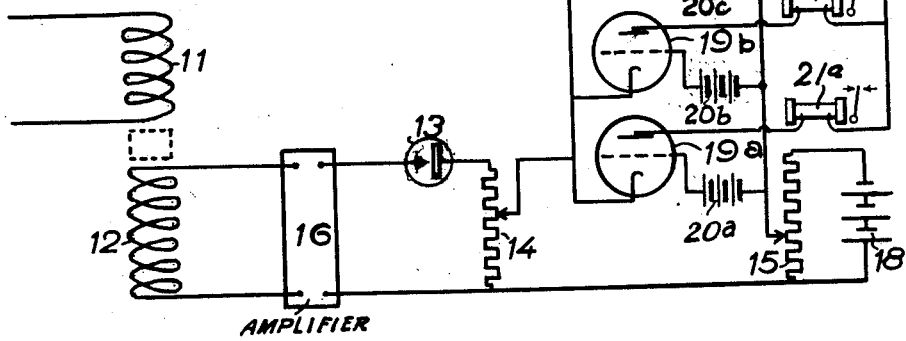
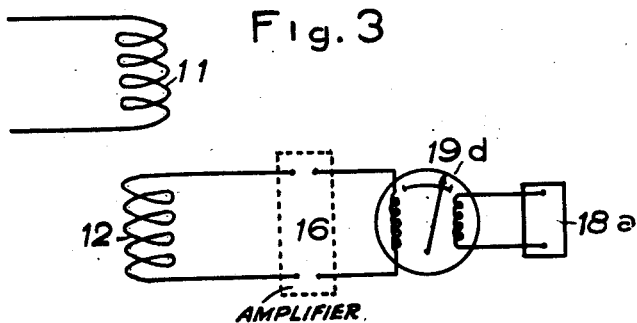
INVENTOR
george V. Nolde Oct. 12, 1943.  G. V. NOLDE  2,331,418
APPARATUS FOR MEASURING MAGNETIC CHARACTERISTICS OF MATERIALS
Filed Jan. 8, 1940  2 Sheets-Sheet 2
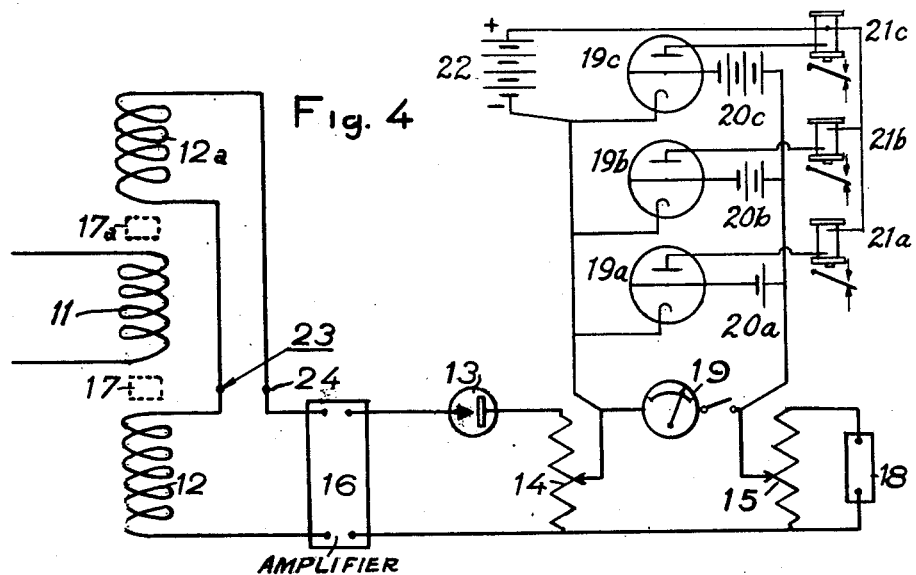
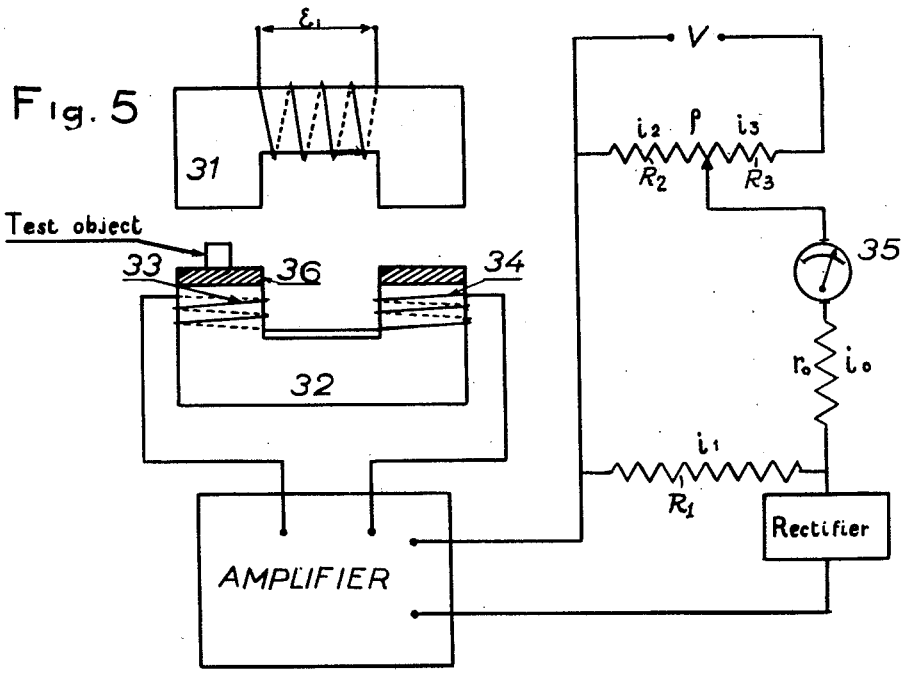
INVENTOR
George V. Nolde Patented Oct. 12, 1943

2,331,418

UNITED STATES PATENT OFFICE 2,331,418

APPARATUS FOR MEASURING MAGNETIC CHARACTERISTICS OF MATERIALS

George V. Nolde, Berkeley, Calif., assignor of forty per cent to George A. Rubissow, New York, N. Y.

Application January 8, 1940, Serial No. 312,891

5 Claims. (Cl. 175—183)

This invention constitutes a novel method and apparatus for measuring magnetic properties of materials. It is particularly suitable for measuring the uniformity of magnetic properties in comparison with same in some standard sample (aetalon).

The herein described invention represents an improvement upon the magnetometers.

The known type of magnetometers, such as Rowland's or Hopkinson's, have a common feature which consists in the determination of the magnetic properties of the materials under test by measuring the induced currents in a secondary electric circuit which is magnetically coupled with a primary circuit.

One of the aspects of this invention consists in producing a system having greater electrical secondary currents per each unit of measured magnetic permeability, thus increasing the precision of measuring of the latter.

Another aspect of this invention is to produce a system affording greater total final reaction per given total value of the magnetic properties in question, thus increasing the sensitivity of measurement.

The difference between "sensitivity" and "precision" of a method is explained as follows:

If, for instance, the final reaction obtained during the measurement of say 100 units of magnetic permeability consists of a declination of a galvanometer arm to a certain angle $\theta$, while 101 units give a declination to another angle $\theta_1$, the difference between $\theta$—$\theta_1$, being the least physically perceptible, then the sensitivity of the method is limited to one unit of permeability. This sensitivity could be increased by using either a microscope, or a more sensitive galvanometer, or an amplifier placed before the galvanometer. Precision of measurement, however, would not be increased by using these implements, inasmuch as the error in the primary correlation between the measured characteristics and the induced currents will be augmented here as much as the declination itself.

In short, "sensitivity" of a method involves a qualitative factor in measurement (convenience of reading), whereas "precision" is connected with quantitative factors, i. e., the relation of the observed values to the theoretically correct.

The novel features of this invention will more fully appear from the following description when the same is read in connection with the accompanying drawings and the appended claims. It is to be expressly understood, however, that the drawings are for purposes of schematical illustration only and are not intended as a definition as to the design or to the limits of the several aspects of this invention.

All figures represent different aspects of schemes and diagrams of the said invention in simplified form of illustration.

In the drawings wherein like reference characters refer substantially to like parts throughout the several views:

Figs. 1, 2, 3, 4 represent schematical diagrams of different aspects of the apparatus.

Fig. 5 represents a diagrammatic scheme representing a circuit arrangement substantially similar to that presented on Fig. 4 but modified and marked with indexes to conform to equations illustrating the theoretical explanation of the invention.

One of the aspects of the apparatus, shown on Fig. 1, consists of a device having two coils 11 and 12 placed in the proximity to each other. Thus, part of the magnetic field of each respective coil is common to them both. Coil 11 is supplied with an electric current with the voltage of effective constant value which voltage and consequently current undulate or oscillate with any frequency. Commercial frequencies as well as high frequencies are equally suitable.

As it is well known a secondary voltage oscillating with the same frequency as the primary current in the coil 11 then will be induced in the coil 12. This secondary voltage is delivered to the amplifier 16 which transforms the undulations of the secondary voltage into corresponding undulations of a secondary current.

Construction of the amplifier 16 plays no important part for this invention as long as it is of a voltage-current transformation type, that is to say, so long as its input resistance is of such a magnitude that it does not permit any appreciable current to flow in the coil 12 thus providing substantially "open circuit" condition for the coil 12. It will be also apparent from the theoretical considerations described later in the specification that in the coil 11 for proper functioning of this system it is essential to have negligent ohmic resistance so that most of counter-electro motiveforce is supplied by the self induction of this coil 11. This condition could be achieved by any known in the art way of coil construction giving high ratios of self-induction to resistance (e. g. heavy gage of wire for given quantity of turns increased relation of length to cross-section etc.).

In Equations 82 and 95 to 110 later given in this specification, the significance of these conditions is fully disclosed.

It will be understood however that provided the instrument 19 is sensitive enough so that it could work in conjunction with the resistance 14 of great enough value to fulfill the aforestated condition of said substantially "open circuit" for the coil 12 no amplification is necessary. In both cases coil 11 must have aforesaid construction permitting the current passage through it substantially unlimited by ohmic resistance of the coil 11 itself as well as by resistances and impedances of its supply circuit other than self induction of this coil 11.

The object to be tested for its magnetic characteristics is placed in any part of the field which is common to both coils 11 and 12. This space is schematically shown by the quadrangle 17 (Fig. 1).

A standard reference sample whose magnetic properties are known and which has the same shape as the objects to be tested, which sample will be hereinafter termed for brevity as "aetalon," is placed in the intended space 17 of the field of the coils 11 and 12 and the secondary current either direct from the coil 12 or produced by the aforesaid type of amplification by amplifier 16 is rectified by a rectifier 13 and produces a definite electromotive force in the potentiometer 14. The electromotive force is balanced against the E. M. F. produced in another potentiometer 15 by a constant source of E. M. F. 18.

To test the magnetic characteristics of the desired objects they are placed in the magnetic field of the coils 11 and 12 instead of aetalon.

If an object under test possesses a magnetic characteristic different from that of the aetalon, the coupling between the coils 11 and 12 changes, and there shall be a deflection on the indicator 19 which may be calibrated according to the difference of magnetic characteristics between the object and the aetalon.

Indicator 19—Fig. 4 and Fig. 1—could be represented by any device responsive to E. M. F. or electric current. A galvanometer, a gaseous discharge tube to the grid of which the E. M. F. from the potentiometers 14 and 15 is applied, a voltage relay and such like devices could be employed in place of 19.

Gaseous discharge tubes or voltage relays could be set to react whenever the difference of magnetic properties between the aetalon and the object under test reaches a predetermined value. Several devices of this kind could be used in multiple. Fig. 2 represents an example of utilization of several gaseous discharge tubes 19a, 19b, 19c, each biased by different voltages 20a, 20b, and 20c. When the magnetic characteristics in the object under test depart from that value of the aetalon to the degree which creates E. M. F. between the potentiometers 14 and 15 enough to counterbalance the tube 19a the relay 21a is energized in the circuit of the source 22. When the unbalance increases the tubes 19b and 19c are actuated. Thus, sorting of the objects according to their magnetic uniformity could be readily achieved. In Fig. 4 is shown an arrangement of several differentially biased triodes connected to the potentiometers 14 and 15 in the manner identical with that described in connection with Fig. 2 and serving the same purpose.

It should be understood that the application of rectifier 13 and potentiometers 14 and 15 could be substituted by any form of a differential E. M. F. measuring system. In Fig. 3 is shown, for example, one aspect of the system applying a differential galvanometer 19d with two coils, one of which is under the influence of the amplified or non-amplified current from the coil 12, whereas the second is affected by the current from a constant source 18a. In this case rectification is not necessary. The voltmeter is balanced for zero reading against aetalon, and the deflection of magnetic properties is registered by the differential galvanometer directly.

In certain cases it is convenient to counterbalance some of the alternating current induced in the coil 12 previous to its measuring in a differential system 14, 15, 19 and 18a.

Fig. 4 shows another aspect of such counterbalancing. The coil 12a is placed symmetrically with coil 12 and both are wound in opposition. The object under test as well as the aetalon is placed into the field common only to two of the three coils, i. e. between either 11 and 12 or 11 and 12a. This arrangement relieves the differential measuring system from too great surges of E. M. F. when objects under test as well as aetalon are being in the course of movement. No current is delivered to the differential system when there is no object in the field of the coil 11.

The same result of counterbalancing of the A. C. induced in the coil 12 could be achieved by delivering to the points 23 and 24 of A. C. of the identical phase and voltage from any other source than the symmetrically placed coil 12a.

Another arrangement as shown on Fig. 4 permits also to make a direct comparison between the aetalon and the object by placing them simultaneously—the aetalon into 17 and the tested object into 17a or vice versa.

In all of the above described varities of herein presented method the coils in question could be either with or without iron cores.

They may also be connected into magnetic circuit with the help of yokes and armatures placed outside or surrounding their turns.

Another aspect of this invention appears more fully from the mathematical theory described hereunder, the disclosure of which constitutes in its first part a prior art and in its second part discloses the data which permits the building of different types of apparatus, the construction of which is substantially governed by the said second part of this mathematical theory. The part of this theory dealing with the particular method of counterbalancing as disclosed by Fig. 5 (for which all below given equations are construed) is not obligatory, as other aspects of this invention are constructed in a manner as described heretofore in relation with Figs. 1, 2, 3, and 4. Namely, Figs. 1, 2 and 3 present the case when the initial voltage value (delivered by the secondary circuit with standard sample in the space 17) is counterbalanced only by the opposition of a differential source of voltage 18 and 18a. Figs. 4 and 5 present the case when this value is counterbalanced in addition to aforestated differential sources 18 and V also by symmetrically located coils 12a in Fig. 4 and 34 in Fig. 5. In Fig. 4 the second symmetrical coil 12a is a stronger counterbalancing factor on account of its increased coupling to primary coil due to the presence of a test object in the space 17a simultaneously with standard object in the space 17, whereas in Fig. 5, for which case the bulk of calculations is made, the symmetrically located coil 34 (corresponding to the 12a in Fig. 4) is coupled through an empty air gap with the primary circuit. The main principle of the method however being common to all of these minor modifications is made apparent for all of them by below given treatise upon one of them, namely as presented in Fig. 5.

To illustrate the practical application of one of the aspects of this invention by a concrete example: it is used in the problem encountered by a leading American manufacturer of canned fruit juice.

The said manufacturer found it absolutely necessary to be able to separate from a batch of cans filled with fruit juice those which were made of a hot reduced plate from those made of cold rolled metal, the former corroding under the influence of this specific juice.

In recent years measurement of magnetic permeability assumed a new importance in metal industries as more and more of the physical properties of ferro-magnetic metals and alloys are found to be connected with their magnetic characteristics.

By measuring the magnetic permeability of the ends of the cans with the method described herein, the above mentioned separation has been successfully achieved. The definition of permeability of the bodies of cans has encountered some difficulties, the nature of which would be best understood from the below given discourse upon this method, which should be solved by further experimental investigation.

The particularity and advantages of the herein presented method could be best understood by comparing it with classical methods, such as Rowland's or Hopkinson's; the method as described herein being an improvement of their principle.

Both Rowland and Hopkinson use a primary coil and a secondary coil. The current in the primary coil establishes a magnetic field common to the secondary coil. Sudden change of the magnetic field produces a surge of current in secondary coil. This surge is measured by ballistic galvanometer and is related to the induction in the iron body of the object under test. The change of field is accomplished in Rowland's method by interruption of the current in the primary coil, while Hopkinson applies quick withdrawal of the secondary coil from the field.

The sample under test is so arranged that the reluctance of the magnetic path could be considered as produced only by that sample. This is achieved either by using a ring-shaped sample (Rowland), or using a very large yoke in conjunction with a small rod-shaped sample (Hopkinson), in which case the reluctance of the former is neglected in computation.

Also in one modification of Hopkinson's method an aetalon rod of known permeability is used to establish the form factor of the reluctivity of the magnetic path in the sample in question.

Permeability in these methods is computed as ratio of maximum induction in the sample $B_{max}$ to the strength of exciting field H.

$$\mu = \frac{B_{max}}{H} \qquad (71)$$

Thus, the direct result of the measurement is the induction in the sample.

Rowland gives in his method the following equation for the definition of value $B_{max}$ $$B_{max} = \frac{\theta}{an_2c} \qquad (72)$$

Where $\theta$ is the angle of declination of the galvanometer arm, $a$ area of cross section of the tested object, $n_2$=quantity of secondary turns, and $c$ a constant.

It is interesting to examine the underlying theory of the above computation in order to better comprehend the improvements laid into the basis of the apparatus in question.

Upon interruption of existing field, induction B (in the object under test) changes in reference to time, so that $$B = B_{max}(f, t) \qquad (73)$$

let be $$\frac{dB}{dt} = (f, t) \qquad (74)$$

Then the secondary voltage $e_s$ at any given moment is $$e_s = -B_{max}\, pn_2a\frac{dB}{dt} = -B_{max}\, pn_2a(f, t) \qquad (75)$$

Here $p$ is unit-transfer constant (if $e_s$ is expressed in volts, $a$ in square centimeters $p=10^{-8}$).

The throw of a ballistic galvanometer $\theta$ is proportional to the quantity of electricity passed in the secondary circuit. If $r$ is the resistance of the secondary circuit, we have $$\theta = \int_0^{t_1} \frac{-gB_{max}\, pn_2a}{r}(f, t)dt = \left[\frac{-gB_{max}\, pn_2a}{r}(f, t)\right]_0^{t_1} \qquad (76)$$

Here $g$—galvanometer constant, and $t_1$—time of the end of current surge.

From (73) $B=B_{max}$ when $t=0$ and $B=0$ when $t=t_1$, therefore, $$\theta = \frac{gp}{r}B_{max}\, n_2a \qquad (77)$$

hence $$B_{max} = \frac{\theta}{\left(\frac{gp}{r}\right)n_2a} = \frac{\theta}{cn_2a} \qquad (78)$$

Constant $g$ is determined by measuring the galvanometer throw produced by some known current surge, usually by discharging a condenser of a known capacity $C_1$ charged to a known voltage $e$.

$$g = \frac{\theta_1 10^6}{c_1 e} \qquad (79)$$

When determination of absolute values of permeability is of secondary importance and the main consideration is to determine the degree of declination of magnetic properties in a given object from some aetalon sample, a different approach to the problem becomes possible. An introduction of a system permitting the use of a zero-method of measurement and achievement of much greater values of angular declination per unit of measured induction is a desirable goal in such a case.

In this apparatus these objectives have been achieved by the following arrangement.

The apparatus consists (Fig. 5) of two identical iron yokes 31 and 32. On the yoke 31 there is a single coil fed by an alternating current of constant voltage and frequency. On the yoke 32 there are two coils 33 and 34 connected in opposition.

By careful adjustment of the distances between the opposite poles, voltages in the coils 33 and 34 are brought to equality.

A standard aetalon of permeability or a reference sample of exactly the same shape and dimensions as the objects to be tested is put over one of the ends of the yoke 32. This disturbs the balance of the magnetic circuit and in a corresponding coil the voltage increases. Output of the secondary windings is amplified and rectified, thus being transformed into a difference of potentials across the resistor R. This E. M. F. is balanced by a source constant D. C. voltage through potentiometer $p$, so that for aetalon-sample the reading of the instrument 35 is brought to zero.

When objects of the same size and shape are placed instead of the aetalon over one of the poles of the yoke 32 the slightest difference of permeability of the inspected objects produces a declination in the instrument 35 which can be calibrated for the purpose in view.

The regularity of the shape of the inspected objects should be rather considerable. Also the bulk of iron under examination must be comparable to the air gap volume between the yokes 31 and 32.

Non-magnetic spacers 36 put over the pole ends eliminate the tendency of the system to detect surface irregularities rather than permeability changes. If and when desired, however, the objects in question could also be inspected for the surface regularity by removing the magnetic spacers and rolling the objects over the pole ends in close contact.

Any type of rectifier and amplifier could be used for practical applications of the circuit of Fig. 5 as well as for other aspects. As it is known in the art, a thermionic rectifier and a balanced type of amplifiers are the best suitable for a measuring system as giving the best stability. As it has been already mentioned it does not matter what particular technique of amplification and rectification is used so long as it gives a stable over-all voltage-current transformation of a specified value for the given field strength. (Refer to Equations 95 to 110 for further treatment of the subject.)

To evaluate the sensitivity of the above described method, in comparison with Rowland's and Hopkinson's, the following calculation is set forth.

Let $n_1$ be the number of turns in the primary coil, $n_2$ number of turns in coils 33 and 34, $a$ cross section of yokes, $e_1$ $e_2$ primary and secondary voltages in corresponding coils, $f$ frequency of current in coil 31, $B_1$ induction in the yoke 31, $B_2$ induction in the pole ends of the yoke 32.

No ferromagnetic objects being between the yokes 31 and 32, we have under the sinusoidal feeding voltage $$e_1 = pn_1 a \frac{dB_1}{dt} = 2\pi f p n_1 a B_{1\max} \cos 2\pi f t \quad (82)$$

or for the effective value of $e_1$ $$E_1 = \frac{2\pi f p n_1 a B_{1\max}}{\sqrt{2}} \quad (83)$$

hence $$B_{1\max} = \frac{E_1 \sqrt{2}}{2\pi f p n_1 a} \quad (84)$$

At the same time effective values $E_2$ of secondary voltages in the coils 33 and 34 are given as $$E_2 = \frac{2\pi f p n_2 a B_{2\max}}{\sqrt{2}} \quad (84a)$$

and if K is a coefficient of field dispersion $$B_2 = K B_{1\max} = \frac{K E_1 \sqrt{2}}{2\pi f p n_1 a} \quad (85)$$

Putting the value of $B_2$ into (84a) we obtain for K $$K = \frac{E_2}{E_1} \cdot \frac{n_1}{n_2} \quad (86)$$

Thus measuring $E_2$ $E_1$ and computing K from (86) we determine by (85) the order of the value of the existing field in which the objects are to be tested for permeability definition.

When on one of the pole ends of the yoke 32 is placed a paramagnetic body, the symmetry of the magnetic circuit is disturbed.

Let $E_2^1$ be an effective value of the voltage in the secondary coil with our aetalon placed over it, and $B_2^1$ a corresponding induction $$B_{2\max}^1 = \frac{E^1 \sqrt{2}}{2\pi f n_2 a p} \quad (87)$$

Also let introduce a difference $B_d$ of induction in a free pole and a pole covered with aetalon, so that $$B_d = B_2^1 - B_2, \text{ and } E_d = E_2^1 - E_2 \quad (87a)$$

Apparently $$E_d = \frac{2\pi f p n_2 a}{\sqrt{2}} B_{d\max}; \quad B_{d\max} = \frac{E_d \sqrt{2}}{2\pi f p n_2 a} \quad (88)$$

If $a_D$ is the contact area of the aetalon and corresponding pole end, $B_D$—actual induction in the aetalon at that junction area, it is obvious that the magnetic flux $\phi_d = B_D a_D$ through this junction area is comparable and consists of a portion of the entire flux $B_2^1 a$ producing the E. M. F. $E_2^1$. Expressing this mathematically, we have $$B_D = \frac{y a B_2^1}{a_D} \quad (89)$$

where $y$ is a coefficient of proportionality.

Taking into account (87a) we obtain $$B_D = \frac{ay(B_2 + B_d)}{a_D} \quad (89a)$$

The exact value of coefficient $y$ would be interesting only when absolute values of permeability are to be found and its definition is discussed elsewhere. For our purpose its value could be taken as arbitrary one (final results being attained by suitable calibration against aetalons of known permeability).

Now from (89a) will be $$B_{d\max} = \frac{B_{D\max} a_D}{ay} - B_{2\max} \quad (90)$$

Putting value of $B_{d\max}$ from (90) into (88)

$$E_d = \frac{2\pi f p n_2 a_D}{y\sqrt{2}} B_{D\max} - \frac{2\pi f p n_2 a}{\sqrt{2}} B_{2\max} = \alpha B_{D\max} - \sigma \quad (91)$$

Let $B_D^1$ be the induction produced by this field in any other than aetalonic object of the same shape and size and $E_D^1$ the resulting E. M. F. from the secondary windings with such an object between yokes. Then $$E_D^1 = \alpha B_D^1 - \sigma \quad (92)$$

Now let each unit of effective E. M. F. which is put in the amplifying rectifying system (as shown on Fig. 1A) produce $g$ units of effective direct current in the rectifier. Then for the circuits $R_1$, $R_2$, $R_3$, and $r_0$ the following Kirchkoff's equations are obtained (all under condition $i = E_d g$).

$$i_2 R_2 + i_0 r_0 = R_1 i_1$$
$$i - i_1 = i_0$$
$$i_3 + i_0 = i_2$$
$$i_3 R_3 + i_2 R_2 = V$$

Which after solution give for the current in this instrument.

$$i_0 = i\left(1 - \frac{R_2^2 - r_0 \rho - R_2 \rho}{R_2^2 - (r_0 + R_1)\rho - R_2 \rho}\right) - \left(\frac{V R_2}{R_2^2 - (r_0 + R_1)\rho - R_2 \rho}\right) \quad (94)$$

Here $\rho = R_3 + R_2$.

Now (94) is written in the following shape $$i_0 = E_D g(1 - M - Vu) \quad (95)$$

By adjustment of potentiometer $p$ the following condition is obtained, when $$u = \frac{E_D g(1-M)}{V} \quad (96)$$

which is satisfied by having $$R_2 = \frac{E_D g \rho R_1}{V} \quad (97)$$

With these conditions the input provided by aetalonic samples gives zero reading $$i_0^1 = 0$$

When in the amplifying system there is an input of $E_D{}^1$, then with setting of resistor's according to (97) the following is received out of (95) and (96).

$$i_0^1 = E_D{}^1 g(1-M) - E_D g(1-M) = g(1-M)(E_D{}^1 - E_D) \quad (98)$$

putting into (88) values for $E_D$ and $E_D{}^1$ out of (91) and (92) the following is obtained $$i_0^1 = (1-M)g\alpha(B_D{}^1 - B_D) = \frac{2\pi f p n_2 a_D g(1-M)}{y\sqrt{2}} B''_{D\ max} \quad (99)$$

Here $B_D''$ is the value of induction change in the object under test to detect which change is to be determined.

To compare the precision of the herein described method with that of the classic method, it is assumed that the same sensitivity of detection is taken for both methods, i. e. if one unit of quantitative electricity produces $q$ degrees of declination in ballistic galvanometer, in this case one unit of E. M. F. multiplied by constant "$g$" produces the same effect on the arm indicator. This assumption is necessary in order to eliminate from the comparison the differences in final declination per unit of induction afforded by amplification in this method. That is to say, the sensitivity of indication in the classic method could be increased likewise by placing a current amplifier between the ballistic galvanometer and secondary winding. Such an increase of the indication-sensitivity only, however, affects the convenience of observation in either method. The errors in primary correlation between the measured inductions and corresponding induced electromotive forces would be augmented by such an increase in indication-sensitivity as well as the main phenomena in question.

Assuming that in this method $$\theta = i'_0 z \quad (100)$$

and in keeping with the explanation given above $$q = zg \quad (101)$$

Then out of (100) and (99)

$$\theta = \left[\frac{2\pi f q(1-M)}{y\sqrt{2}}\right] p n_2 a_D B''_{D\ max} \quad (102)$$

Now assuming $$\frac{2\pi f q(1-M)}{y\sqrt{2}} r = q^1 \quad (103)$$

where $r$ is arbitrarily chosen as constant to equal the value of the same symbol in (77).

Then (102) can be written as follows:

$$\theta = \frac{q^1 p n_2 a_D}{r} B''_{D\ max} \quad (104)$$

Let $\theta_R$ be a declination per unit of measured induction in Rowland's method and $\theta_N$ the same in this method of (77) and (104) the following will be obtained $$\theta_R = \frac{\theta}{B_{max}} = \frac{qpn_2}{r} \quad (105)$$

and $$\theta_N = \frac{\theta}{B''_{D\ max}} = \frac{q^1 p n_2 a_D}{r} \quad (106)$$

In (103) by adjustment of resistor's values affecting the coefficient M (refer to Equation 95).

The condition whereby $$y\sqrt{2} = (1-M) r \quad (107)$$

is easily obtained. Under which condition $$q^1 = 2p f q \quad (108)$$

Assuming for the purpose of comparison that all conditions in both methods are equivalent, which implies $$\frac{p n_2 a}{r} = \frac{p n_2 a_D}{r} \quad (109)$$

From (105), (106), (108) and (109) is obtained $$\frac{\theta_N}{\theta_R} = \frac{q^1}{q} = 2\pi f \quad (110)$$

This shows that, while having the same sensitivity of detection in both methods, handling the same bulks of metal between the coils of equal sizes, herein presented method gives in $2\pi f$ times greater reaction per unit of involved induction than the classic technique.

Now without introducing any sizable errors of capacitive coupling between primary and secondary windings in this method frequency could be used in the order of 200 cycles second, which would give in this method about 1,200 times better discrimination of the magnetic characteristics of the inspected objects than in the classical technique.

The effects of different tempering, cold working, crystal structure, metalloid contents and such like data could be expected to be determined in the metal objects of the ferromagnetic group by application of such a methodology.

It is strongly indicated that for the industries manufacturing standard shaped objects, like can manufacturing industry, automotive parts producing, steel mills, etc., further research upon this method may bring many advantages.

The use of different aspects of this invention constitutes several aspects of methods for controlling various goods and materials. All can industry, packing tin industry for vegetables, fruit, meat, or any other products could be very easily checked or measured as described by means of the apparatus and method. All metals or metal alloys, machine parts, etc., could also be tested and measured by this device and method.

The described aspects are only given by way of example and do not limit the invention in its other forms.

Having now described and ascertained the nature of this invention and in what manner said invention operates, I declare that what I claim is:

1. An apparatus for registering magnetic properties of an object consisting of a primary coil, a first source of alternating current for energizing said primary coil to produce an alternating magnetic field adjacent thereto, a secondary coil provided with output terminals and placed in said magnetic field for receiving at least a part of the flux of said magnetic field and for producing thereby an alternating secondary potential at said output terminals, said coils being so disposed as to permit the insertion of an object in the magnetic field therebetween, a second source of alternating current of the same frequency and phase as produced at said output terminals of said secondary coil, a rectifier means, potentiometer means including a pair of fixed terminals and an adjustable intermediate terminal, means connecting said secondary coil and said second source in series with each other across the fixed terminals of said potentiometer means in series with said rectifier means, said secondary coil and said second source being connected with their voltages in opposition, a plurality of vacuum tubes each having a cathode, control electrode and anode, circuit means connecting one fixed terminal and the adjustable terminal of said potentiometer means across the cathode-control electrode circuit of each of said vacuum tubes, means in each of said last named circuit means for providing a different bias on the control electrode of each of said vacuum tubes, discharge circuits for each of said vacuum tubes including a power source, and a translating device connected in the discharge circuit of each of said vacuum tubes.

2. An apparatus for registering magnetic properties of an object consisting of a primary coil, a first source of alternating current for energizing said primary coil to produce an alternating magnetic field adjacent thereto, a secondary coil provided with output terminals and placed in said magnetic field for receiving at least a part of the flux of said magnetic field and for producing thereby an alternating secondary potential at said output terminals, said coils being so disposed as to permit the insertion of an object in the magnetic field therebetween, a second source of alternating current of the same frequency and phase as produced at said output terminals of said secondary coil, an amplifier means including an input circuit means and an output circuit means, a rectifier means, a potentiometer means including a pair of fixed terminals and an adjustable intermediate terminal, means connecting said secondary coil and said second source in series with each other and with the input circuit means of said amplifier means, said secondary coil and said second source being connected with their voltages in opposition, said output circuit means of said amplifier means being connected across the fixed terminals of said potentiometer means in series with said rectifier means, a plurality of vacuum tubes each having a cathode, control electrode and anode, circuit means connecting one fixed terminal and the adjustable terminal of said potentiometer means across the cathode-control electrode circuit of each of said vacuum tubes, means in each of said last named circuit means for providing a different bias on the control electrode of each of said vacuum tubes, discharge circuits for each of said vacuum tubes including a power source, and a translating device connected in the discharge circuit of each of said vacuum tubes.

3. An apparatus for registering magnetic properties of an object consisting of a primary coil, a source of alternating current for energizing said primary coil to produce an alternating magnetic field adjacent thereto, a first secondary coil provided with output terminals and placed in said magnetic field for receiving at least a part of the flux of said magnetic field and for producing thereby an alternating secondary potential at said output terminals, said coils being so disposed as to permit the insertion of an object in the magnetic field therebetween, a second secondary coil placed in said magnetic field symmetrically with said first secondary coil relative to said magnetic field, a rectifier means, potentiometer means including a pair of fixed terminals and an adjustable intermediate terminal, means connecting said first secondary coil and said second secondary coil in series with each other across the fixed terminals of said potentiometer means in series with said rectifier means, said first secondary coil and said second secondary coil being connected with their voltages in opposition, a plurality of vacuum tubes each having a cathode, control electrode and anode, circuit means connecting one fixed terminal and the adjustable terminal of said potentiometer means across the cathode-control electrode circuit of each of said vacuum tubes, means in each of said last named circuit means for providing a different bias on the control electrode of each of said vacuum tubes, discharge circuits for each of said vacuum tubes including a power source, and a translating device connected in the discharge circuit of each of said vacuum tubes.

4. An apparatus for registering magnetic properties of an object consisting of a primary coil, a source of alternating current for energizing said primary coil to produce an alternating magnetic field adjacent thereto, a first secondary coil provided with output terminals and placed in said magnetic field for receiving at least a part of the flux of said magnetic field and for producing thereby an alternating secondary potential at said output terminals, said coils being so disposed as to permit the insertion of an object in the magnetic field therebetween, a second secondary coil placed in said magnetic field symmetrically with said first secondary coil relative to said magnetic field, an amplifier means including an input circuit and an output circuit means, a rectifier means, a potentiometer means including a pair of fixed terminals and an adjustable intermediate terminal, means connecting said first secondary coil and said second secondary coil in series with each other and with the input circuit means of said amplifier means, said first secondary coil and said second secondary coil being connected with their voltages in opposition, said output circuit means of said amplifier means being connected across the fixed terminals of said potentiometer means in series with said rectifier means, a plurality of vacuum tubes each having a cathode, control electrode and anode, circuit means connecting one fixed terminal and the adjustable terminal of said potentiometer means across the cathode-control electrode circuit of each of said vacuum tubes, means in each of said last named circuit means for providing a different bias on the control electrode of each of said vacuum tubes, discharge circuits for each of said vacuum tubes including a power source, and a translating device connected in the discharge circuit of each of said vacuum tubes.

5. An apparatus for comparing magnetic characteristics of one object with magnetic characteristics of a second object consisting of a primary coil, a source of alternating current for energizing said primary coil to produce an alternating magnetic field adjacent thereto, a first secondary coil provided with output terminals and placed in said magnetic field for receiving at least a part of said magnetic flux, and for producing thereby an alternating secondary potential at said output terminals, a second secondary coil placed in said magnetic field symmetrically with said first secondary coil relative to said magnetic field, said coils being so disposed as to permit the insertion in the magnetic field therebetween of two objects symmetrically with each other in relation to said primary coil, a rectifier means, potentiometer means including a pair of fixed terminals and an adjustable intermediate terminal, means connecting said first secondary coil and said second secondary coil in series with each other across the fixed terminals of said potentiometer means in series with said rectifier means, said first secondary coil and said second secondary coil being connected with their voltages in opposition, a plurality of vacuum tubes each having a cathode, control electrode and anode, circuit means connecting one fixed terminal and the adjustable terminal of said potentiometer means across the cathode-control electrode circuit of each of said vacuum tubes, means in each of said last named circuit means for providing a different bias on the control electrode of each of said vacuum tubes, discharge circuits for each of said vacuum tubes including a power source, and a translating device connected in the discharge circuit of each of said vacuum tubes.

GEORGE V. NOLDE.